United States Patent
Saito

[11] 3,879,655
[45] Apr. 22, 1975

[54] POLARITY INDICATING BATTERY RECEPTACLE

[75] Inventor: Mitsuru Saito, Osaka, Japan

[73] Assignee: Minolta Camera Kabushiki Kaisha, Osaka-shi, Osaka-fu, Japan

[22] Filed: May 7, 1973

[21] Appl. No.: 357,972

[30] Foreign Application Priority Data
May 13, 1972  Japan.................. 47-55644

[52] U.S. Cl. ............ 324/29.5; 200/61.62; 340/249
[51] Int. Cl. .......................................... G01n 27/46
[58] Field of Search .......... 324/29.5, 133; 340/249; 200/51.09, 51.1, 51.11, 61.62, 155 A; 95/11 L

[56] References Cited
UNITED STATES PATENTS

| | | | |
|---|---|---|---|
| 2,771,526 | 11/1956 | Claras et al. ................... 200/61.62 |
| 2,797,405 | 6/1957 | Stelter........................ 200/61.62 X |
| 3,165,037 | 1/1965 | Neudecker et al. ........... 324/29.5 X |
| 3,200,720 | 8/1965 | Drasch......................... 324/29.5 X |
| 3,243,795 | 3/1966 | O'Brien............................ 340/249 |
| 3,259,754 | 7/1966 | Matheson ..................... 324/133 X |
| 3,371,330 | 2/1968 | Howard et al. ................... 340/249 |
| 3,452,347 | 6/1969 | Stimson ............................ 340/249 |
| 3,480,860 | 11/1969 | Rentschler.................... 324/29.5 X |
| 3,583,800 | 6/1971 | Hirata.............................. 324/29.5 |

*Primary Examiner*—Gerard R. Strecker
*Attorney, Agent, or Firm*—Wolder & Gross

[57] ABSTRACT

A battery energized device such as the light measuring or automatic exposure control system of a camera includes a cylindrical housing for holding a battery having an end opening and a removable closure member. A switch is opened by the locked condition of the closure member and is in a closed condition when the closure member is retracted from its closed condition and a diode and an electric lamp are connected in series with the switch across terminals in the housing which engage the battery so that only when the battery is properly oriented in the housing the lamp is momentarily lit as the closure member is moved toward its fully closed position. The switch may include a resilient switch arm which is urged from its normally closed condition by a projection on the closure member as it is turned to its closed position or a pair of contacts on the receptacle are engaged by a conductor on the closure member only before the closure member is in its fully closed position.

8 Claims, 8 Drawing Figures

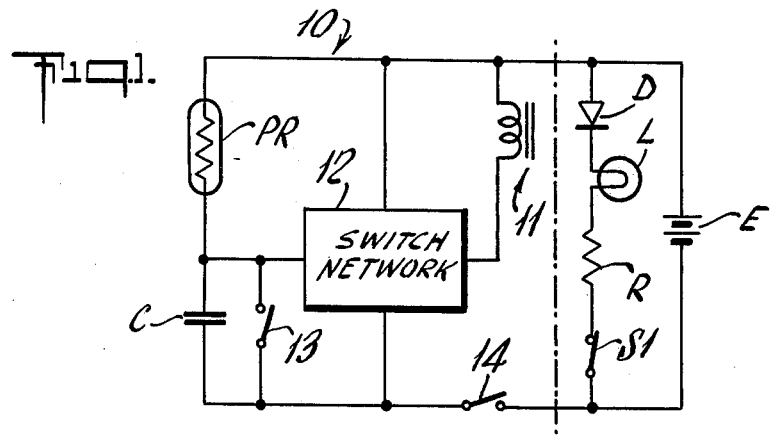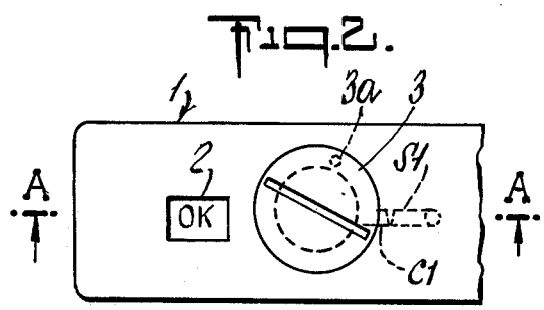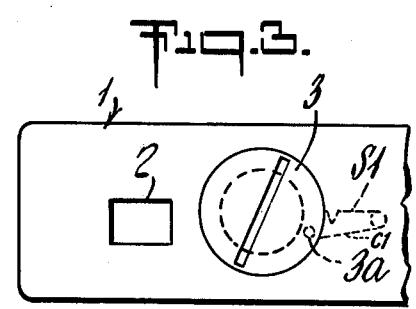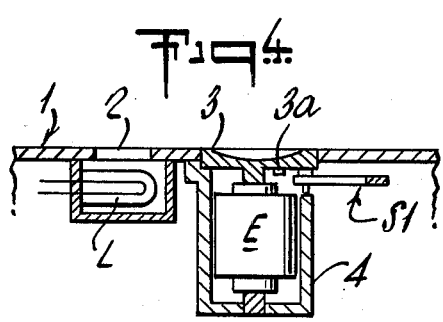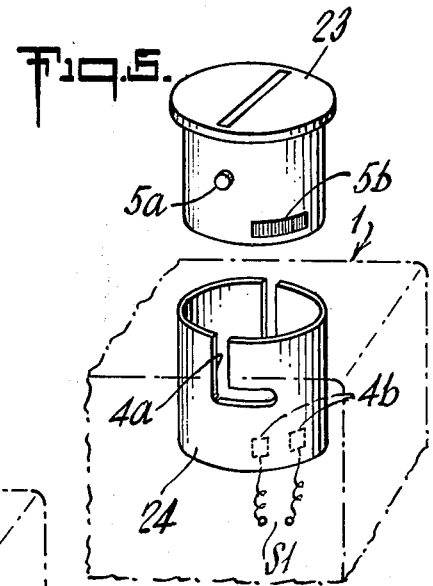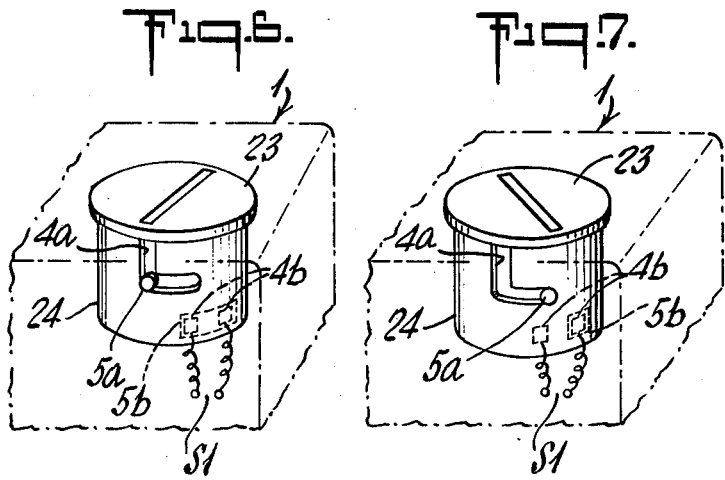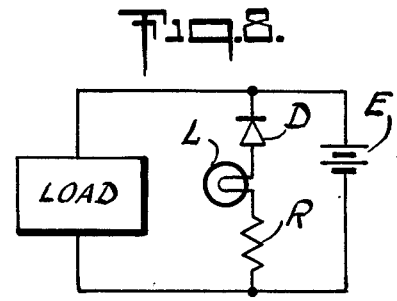

POLARITY INDICATING BATTERY RECEPTACLE

BACKGROUND OF THE INVENTION

The present invention relates generally to improvements in battery operated devices and it relates particularly to improved mechanism for indicating the proper orientation of an energizing battery in the receptacle therefor in a battery operated device.

Many battery operated devices as typified by the light measuring or automatic exposure control system in a camera are energized by a small dry cell battery which is replaceably housed in a receptacle associated with the device. The battery is replaced when consumed, by removing a closure member which closes the housing and replacing the spent battery with a fresh battery. However, it is necessary for the operation of the battery energized device that it be connected to the proper poles of the battery. Many batteries which are commonly employed are symmetrical so that they may be inserted into the battery receptacle improperly oriented whereby the device is connected to the wrong poles of the battery. This improper orientation of the battery does not become evident until the device is used with many consequent drawbacks and disadvantages, and the subsequent need to remove the battery and reverse it.

SUMMARY OF THE INVENTION

It is a principal object of the present invention to provide an improved battery energized device.

Another object of the present invention is to provide an improved electrically operated device energized by a battery of symmetrical configuration.

Still another object of the present invention is to provide an improved battery operated device with means indicating the proper polarity orientation of the energizing battery.

A further object of the present invention is to provide an improved battery receiving receptacle having means for indicating the proper polarity orientation of the battery attendant to the housing of the battery in the receptacle.

Still a further object of the present invention is to provide a device of the above nature characterized by its reliability, simplicity, low cost, ease and convenience of use and great versatility and adaptability.

In a sense, the present invention contemplates the provision of a battery operated device including a battery housing receptacle having an access opening for the insertion of a battery and a cover for the opening movable between a closed advanced position and retractable to an open position. A switch is actuated to an open position with the advance of the closure member to a fully closed position and is in a closed condition when the closure member is rearwardly of its advanced closed position. A polarity responsive electrically actuated indicator is connected in series with the switch across the battery receptacle terminals so as to be energized during the closure of the receptacle only when the battery is properly oriented and is deenergized when the closure member is advanced to its fully closed position.

Advantageously, the polarity responsive indicator includes an electric lamp and a diode connected in series, the diode being oriented to conduct only when the battery is properly oriented in the receptacle. The closure member in its preferred form is rotatable between its closed and open position and the resilient arm of a normally closed switch is located in the path of an eccentric projection on the closure member which bears on the arm and opens the switch when the closure member is in its fully closed position. An alternative form of switch includes a pair of peripherally spaced mutually insulated contact elements located on the inside face of the receptacle cylindrical wall and the closure member includes a skirt wall having on its outer face a conducting strip which bridges the two contact elements when the closure member is rearwardly of its advanced position and is out of engagement with at least one of the contact elements when the closure member is in its fully advanced position.

The improved device is simple, reliable, of low cost and operates with the insertion or replacement of an energizing battery to provide an indication of the proper orientation of the battery and the application and proper closing of the closure member with an insignificant consumption of current.

BRIEF DESCRIPTION OF THE DRAWINGS

FIG. 1 is a schematic view of the electrical network of a preferred embodiment of the present invention as applied to a camera shutter automatic timing system;

FIG. 2 is a fragmentary top plan view of the battery receptacle section thereof in a partially closed condition;

FIG. 3 is a view similar to FIG. 2 with the battery receptacle being shown in a fully closed condition;

FIG. 4 is a sectional view taken along line A—A in FIG. 2;

FIG. 5 is a perspective view of another form of battery receptacle and switch structure which may be employed in the present system shown in a fully open condition;

FIG. 6 is a view similar to FIG. 5 showing the receptacle in a partially closed condition; and FIG. 7 is a view similar to FIG. 6 showing the receptacle in a fully closed condition.

FIG. 8 is a modified schematic showing the diode in the reversed position.

DESCRIPTION OF THE PREFERRED EMBODIMENTS

Referring now to the drawings, and more particularly FIGS. 1 to 4 thereof which illustrate a preferred embodiment of the present invention as applied to the energizing of an automatic electronic shutter timing network, the reference numeral 10 generally designates the shutter timing network which is of conventional construction and includes a solenoid 11 whose state of energization controls the closing of the camera shutter and is connected through the output of a solid state switch network 12 and a switch 14 across a battery E. The switch network 12 is controlled by the timing capacitor C connected to the input of switch network 12, the capacitor C being connected in series with an incident light exposed photoconductor PR across a battery E through switch 12. The capacitor C is shunted by a normally closed switch 13 which is opened with the opening of the shutter and the normally open switch 12 is closed with the depression of the shutter release button. The operation of network 10 is well known and need not be described.

In accordance with the present invention, the battery E is replaceably housed in the usual manner in a battery housing in the camera body provided with terminal contacts which engage the terminals of the housed battery and a voltage polarity indicating network is connected between the battery housing terminals and is deactuated when the housing cover is fully closed. The polarity indicating network includes a diode D, an electric lamp L, a current limiting resistor R and a switch S1 connected in series between the housing terminals. The diode D is so oriented as to conduct only when switch S1 is closed and the battery E is correctly oriented in the battery housing and the switch S1 is open when the battery housing cover is in its fully closed position and is closed when the cover is in a position retracted from its fully closed position.

As best seen in FIGS. 2 to 4, a transparent window 2 carrying suitable indicia, for example, the letters OK, is formed in a wall of the camera body 1 or the body of any associated device, proximate a cylinderical battery housing receptacle 4 closed at its inner end, open at its outer end, which registers with a corresponding opening in the body wall. The receptacle 4 is closed by a closure member or cover which is of circular shape and externally threaded to engage a corresponding thread in the body wall so that the cover 3 is advanced to its fully closed position at a predetermined point by rotation of the cover 3 from its initial engaged position. A switch actuating pin 3a depends from the outer border of cover 3. Contact terminals are centrally located on the bottom face of cover 3 and on the inside face of the bottom wall of the receptacle 4. The lamp L is suitably supported behind the window 2.

The switch S1 is mounted with the body 1 proximate the upper border of receptacle 4 and includes a stationary contact element and a resilient switch arm C1 whose end registers with an aperture in the upper border of the receptacle 4 and which is in normal closed engagement with the switch stationary contact. The switch arm is so positioned relative to actuating pin 3a that the switch is normally closed until the cover 3 is turned to its closed position, in which closed position the pin 3a engages the end of the switch arm and retains it out of engagement with the switch stationary contact, thereby retaining switch S1 in open condition.

In the operation of the device described above, the cover 3 is unscrewed and separated, the spent battery E removed from the receptacle 4 and replaced by a fresh battery E. Upon the application of the cover 3 to the receptacle opening and the rotation thereof to the position shown in FIG. 2, the switch S1 is closed and the receptacle contacts engage the battery terminals, if the battery E is properly oriented in receptacle 4, the lamp L will light by reason of the low resistance of diode D thereby indicating the proper positioning of the battery E. The cover 3 is then turned to its closed position, as shown in FIG. 3, and the switch S1 is thus opened by pin 3a to extinguish lamp L and indicate the closed position of cover 3. In the event that battery E is not properly oriented in receptacle 4, the lamp L will not be lit upon application of the cover 3, by reason of the high reverse resistance of diode D, thereby indicating the need to reverse the battery E in the receptacle 4.

The embodiment of the present invention illustrated in FIGS. 5 to 7 differs from that first described only in the specific construction of the receptacle, cover and switch.

Specifically, the receptacle 24 includes a cylindrical wall and is closed at its bottom and open at its top and positioned in the manner of receptacle 4. Formed in the receptacle cylindrical wall is an L-shaped bayonet slot 4a including a vertical section extending to the top of the wall and a lower horizontal peripheral section. Positioned on the inner face of the lower border of the receptacle peripheral wall are a pair of peripherally spaced flat contact elements 4b which define the terminals of the switch S1.

The closure member 23 is of the shape of a cap and includes a circular top wall and a coaxial depending skirt wall of lesser diameter than the top wall and of an outside diameter slightly less than the inside diameter of the receptacle cylindrical wall. A guide pin 5a radially outwardly projects from the closure member skirt wall and is adapted to slideably engage the bayonet slot 4a with the application of closure member 23. A peripherally extending conducting band 5b is positioned on the outside face of the lower border of the closure member skirt wall and is of a length somewhat greater than the distance between the remote edges of contact elements 4b. The dimensions and locations of contact elements 4b and conductor band 5b are such that when closure member 23 is inserted in receptacle 24 as guided by the pin 5a travelling along the vertical section of bayonet slot 4a, conductor band 5b engages both contact elements 4b upon closure member 23 reaching its lowermost position to thereby close switch S1 and upon the rotation of closure member 23 to bring guide pin 5a from the elbow of bayonet slot 4a to the outer end of the horizontal arm thereof, the conductor band disengages one of the contact elements 4b to open the switch S1. In all other respects, the embodiment last described is similar to that described and their operations are likewise similar.

With the aforementioned mechanism of the present invention, upon the insertion of the battery into the battery receptacle of the battery energized device and the application of the closure member, a signal is provided when the battery is properly oriented and when the closure member is advanced to its fully closed position, the signal is discontinued, thereby indicating the proper closing of the receptacle and eliminating further current consumption. Furthermore, if the diode D of the circuit in FIG. 1 is connected in the reverse direction (to that in the circuit in the FIG. 1.) and series connection of such diode and the lamp L is connected across the battery power source without the interposition of the switch $S_1$, the signal of the lamp can indicate that the battery is placed incorrectly.

While there have been described and illustrated a preferred embodiment of the present invention, it is apparent that numerous alterations, omissions and additions may be made without departing from the spirit thereof.

I claim:

1. A battery energized electrical device comprising a battery receiving receptacle having an access opening and including a separable cover member covering the battery positioned in the receptacle and movable in its covering position between an advanced predetermined closed position and a retracted position, a pair of contact elements, one of said contact elements being mounted inside of said receptacle and the other on said cover member, said pair of contact elements engaging the poles of the battery in said receptacle with said cover member in said covering position, a switch including a pair of electric contact members, means connected to said cover member permitting said contact members to be electrically connected in the retracted position and causing said contact members to be opened in the advanced predetermined closed position, and an indicating means for indicating whether said battery is positioned in the receptacle correctly with regard to its polarity, said indicating means being connected in series with said switch between said contact elements.

2. The device of claim 1 wherein said indicating means includes a diode and an electric lamp, said switch diode and lamp being connected in series between said contact elements.

3. The device of claim 2 wherein said diode is oriented to be conductive when the battery is properly oriented in said receptacle.

4. The device of claim 1 wherein said switch includes a switch arm having one of said contact members resiliently urged into engagement with the other of said contact member, and said means connected to said cover including an actuating element located on and movable with the advance of said cover member along a path engaging said switch arm and urging it out of engagement, with the other of said switch contact members.

5. A battery energized electrical device comprising a battery receiving receptacle having an access opening and including a cover member movable between an advanced predetermined closed position registering with said opening and a retracted position, a pair of contact elements for engaging the poles of a battery positioned in said receptacle in the advanced predetermined position and the retracted position, a switch including a pair of electric contact members, means connected to said cover permitting said contact members to be electrically connected in the retracted position and causing said contact members to be opened in the advanced predetermined closed position, and a polarity responsive electrically energized indicating means connected in series with said switch between said contact elements, said switch including a switch arm having one of said contact members resiliently urged into engagement with the other of said contact member, and said means connected to said cover including an actuating element located on and movable with the advance of said cover member along a path engaging said switch arm and urging it out of engagement with the other of said switch contact members, said receptacle comprising a cylindrical housing open at its top and having one of said contact elements centrally positioned in its bottom wall and said cover member carrying the other of said contact elements on the inside face thereof and said actuating element comprising a projection depending from and eccentrically located on said cover member.

6. A battery energized electrical device comprising a battery receiving receptacle having an access opening and including a cover member movable between an advanced predetermined closed position registering with said opening and a retracted position, a pair of contact elements for engaging the poles of a battery positioned in said receptacle in the advanced predetermined position and the retracted position, a switch including a pair of electric contact members, means connected to said cover permitting said contact members to be electrically connected in the retracted position and causing said contact members to be opened in the advanced predetermined closed position, and a polarity responsive electrically energized indicating means connected in series with said switch between said contact elements, said receptacle comprising a cylindrical housing, said cover member being rotatable in said housing between its advanced and retracted positions and said switch first and second contact members being located on the inside face of said receptacle and including a third peripherally extending contact member mounted on said cover member and movable therewith out of engagement with at least one of said pair of first and second contact members when said cover member is in its advanced position and in engagement with both of said pair of contact members when said cover member is in a retracted position.

7. The device of claim 6 wherein said receptacle has a bayonet slot formed in the cylindrical wall thereof and said cover member includes a depending cylindrical skirt wall slideably and axially telescoping said receptacle and having a projection engaging said bayonet slot, said third contact member being positioned on said skirt wall.

8. A device for indicating the correct polarity placement of a power source, especially a dry cell, with respect to its corresponding load comprising:

a casing having an access opening to receive the dry cells and including a cover movable in its cell covering position registering with said access opening between an inserted position and a completely closed position, said cover being removable from the cell covering position; and a diode, a switch and an indication means connected in series with each other; said diode, switch and indication means being connected in parallel with said load in relation to the power source;

said diode being arranged in a direction which is conductive only when the dry cells are correctly placed, said switch including a pair of electric contact members engaging said cover resulting in said contact members being in open position when said cover is in said completely closed position, and said power source being connected with said load and said diode, switch and indication means when said cover is in said cell covering position.

* * * * *